(12) United States Patent
Brown et al.

(10) Patent No.: US 6,359,249 B1
(45) Date of Patent: Mar. 19, 2002

(54) NO WAT WELDING SYSTEM

(75) Inventors: Ronald C. Brown, Auburn Hills; Steven D. Tracey, Northville; Joseph L. Miller, Rochester, all of MI (US)

(73) Assignee: DCT, Inc., Warren, MI (US)

( * ) Notice: Subject to any disclaimer, the term of this patent is extended or adjusted under 35 U.S.C. 154(b) by 0 days.

(21) Appl. No.: 09/321,931

(22) Filed: May 28, 1999

Related U.S. Application Data

(62) Division of application No. 09/062,950, filed on Apr. 20, 1998, which is a division of application No. 08/424,933, filed on Apr. 19, 1995.
(60) Provisional application No. 60/095,385, filed on Aug. 5, 1998.

(51) Int. Cl.[7] .............................................. B23K 37/02
(52) U.S. Cl. .............................. 219/86.51; 219/86.41; 219/86.33; 219/86.31
(58) Field of Search .......................... 219/86.51, 86.41, 219/86.33, 86.31, 108, 90, 91.1, 102

(56) References Cited

U.S. PATENT DOCUMENTS

| | | | |
|---|---|---|---|
| 4,117,296 A | * | 9/1978 | Becker ..................... 219/91.21 |
| 4,162,387 A | | 7/1979 | De Candia |

(List continued on next page.)

FOREIGN PATENT DOCUMENTS

| | | |
|---|---|---|
| DE | 4432475 A1 | 3/1995 |
| EP | 0350013 A1 | 7/1989 |
| EP | 0649700 A1 | 9/1994 |
| FR | 2692507 | 11/1991 |
| JP | 56160885 | 10/1981 |
| JP | 58165307 | 9/1983 |
| JP | 61150786 | 9/1986 |

OTHER PUBLICATIONS

ISI Power & Manual Industrial Clamps; The ISI Companies; Copyright 1989.
De-Sta-Co (A Dover Resources Company) Brochure; pp. 53–54.
IBM Technical Disclosure Bulletin vol. 17, No. 11, Apr. 1975 "Welding electrode and holder".
PCT International Search Report in International Application No. PCT/US99/16437 date Oct. 10, 2000.

*Primary Examiner*—M. Alexandra Elve
(74) *Attorney, Agent, or Firm*—Rader, Fishman & Grauer PLLC

(57) ABSTRACT

The present invention relates to an improved resistance weld-based gun assembly for use in an electric welding system without a need for plant-provided air and water-cooling circulation systems. In one aspect of the invention, a resistance-based force controller measures the resistance of a secondary circuit of the weld gun, the combined resistance of the secondary circuit in parallel with the circuit formed by the workpieces and opposing electrodes when sandwiched between the electrodes, and calculates the resistance of the workpieces. The measured resistance is compared to a predetermined resistance and the sandwiching force of the electrodes incrementally adjusted until the resistance of the workpieces is acceptable. The invention also relates to a closed loop coolant system having a coolant line, a coolant contained within the coolant line, a heat exchanger, and a mechanical coolant pump. One possible pump comprises an elastic bladder dependent upon the state change of the coolant. A second possible pump comprises a reciprocating extractor mechanically connected to the weld gun actuator. In yet another aspect of the invention, the welding system relies solely on electrode arm material for heat dissipation, the heat being conducted through the electrode arm material to an outer surface of the arm where the heat is dissipated through natural convection. To promote natural convection, a plurality of ribs with channels defined therebetween or openings extending through the arm itself increase the surface area and the rate of convection.

33 Claims, 10 Drawing Sheets

U.S. PATENT DOCUMENTS

| | | |
|---|---|---|
| 4,280,182 A | 7/1981 | Mickowski |
| 4,503,312 A | 3/1985 | Nakata et al. ............ 219/117.1 |
| 4,577,085 A * | 3/1986 | Burgher et al. ............. 219/116 |
| 4,661,680 A | 4/1987 | Swensrud |
| 4,760,633 A | 8/1988 | Dacey, Jr. |
| 4,813,125 A | 3/1989 | Dacey, Jr. |
| 4,827,595 A | 5/1989 | Dacey, Jr. |
| 4,835,730 A | 5/1989 | Shimano et al. |
| 4,852,047 A | 7/1989 | Lavellee et al. |
| 4,884,431 A | 12/1989 | Dacey, Jr. |
| 4,894,908 A | 1/1990 | Haba, Jr. et al. |
| 4,896,087 A | 1/1990 | Onaga et al. |
| 4,912,343 A | 3/1990 | Stuart |
| 4,928,388 A | 5/1990 | Dacey, Jr. |
| 4,931,617 A | 6/1990 | Toyoda et al. |
| 5,014,208 A | 5/1991 | Wolfson |
| 5,025,390 A | 6/1991 | Daggett |
| 5,050,088 A | 9/1991 | Buckler et al. |
| 5,099,158 A | 3/1992 | Stuart et al. |
| 5,103,551 A | 4/1992 | Tamura et al. |
| 5,132,601 A | 7/1992 | Ohtani |
| 5,174,489 A | 12/1992 | Mason |
| 5,187,398 A | 2/1993 | Stuart et al. |
| 5,229,568 A * | 7/1993 | Gobez et al. ............... 219/109 |
| 5,285,373 A | 2/1994 | Watanabe et al. |
| 5,293,157 A | 3/1994 | Yakou |
| 5,321,255 A | 6/1994 | Kakinami et al. |
| 5,341,054 A | 8/1994 | Tal et al. |
| 5,378,868 A * | 1/1995 | Burkhardt et al. ............ 219/89 |
| 5,400,943 A | 3/1995 | Rossi |
| 5,436,422 A | 7/1995 | Nishiwaki et al. |
| 5,504,299 A | 4/1996 | Heckendorn |
| 5,632,911 A | 5/1997 | Wigle et al. |
| 5,742,022 A | 4/1998 | Crawford et al. |

* cited by examiner

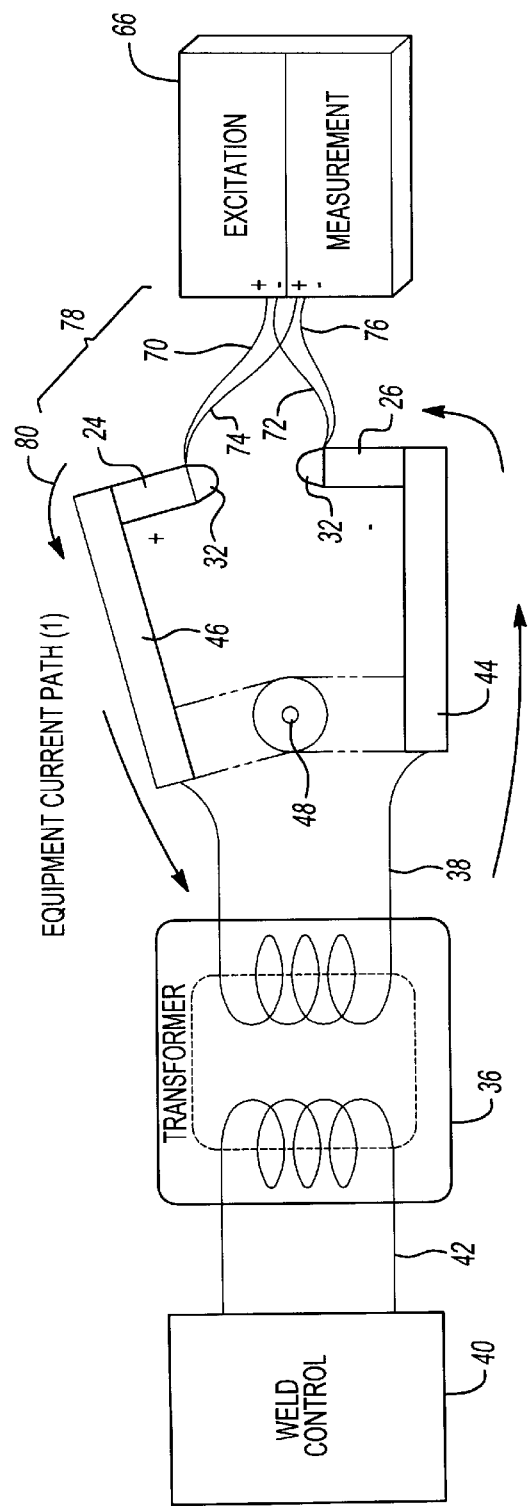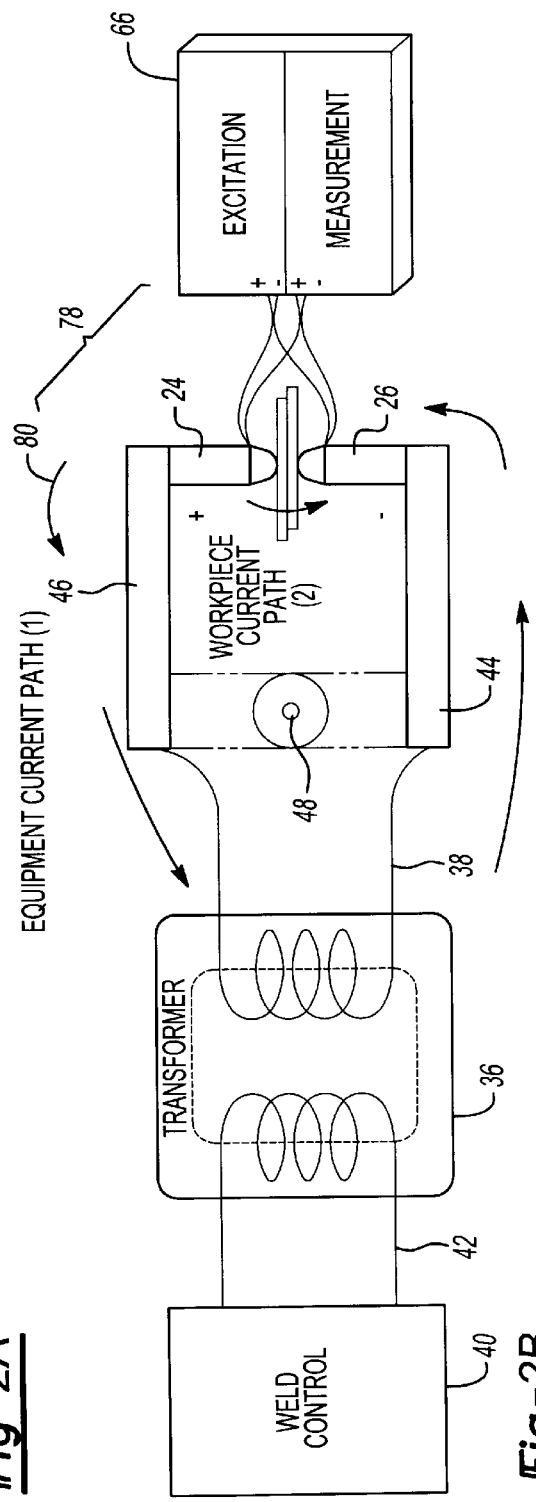
Fig-2A
Fig-2B

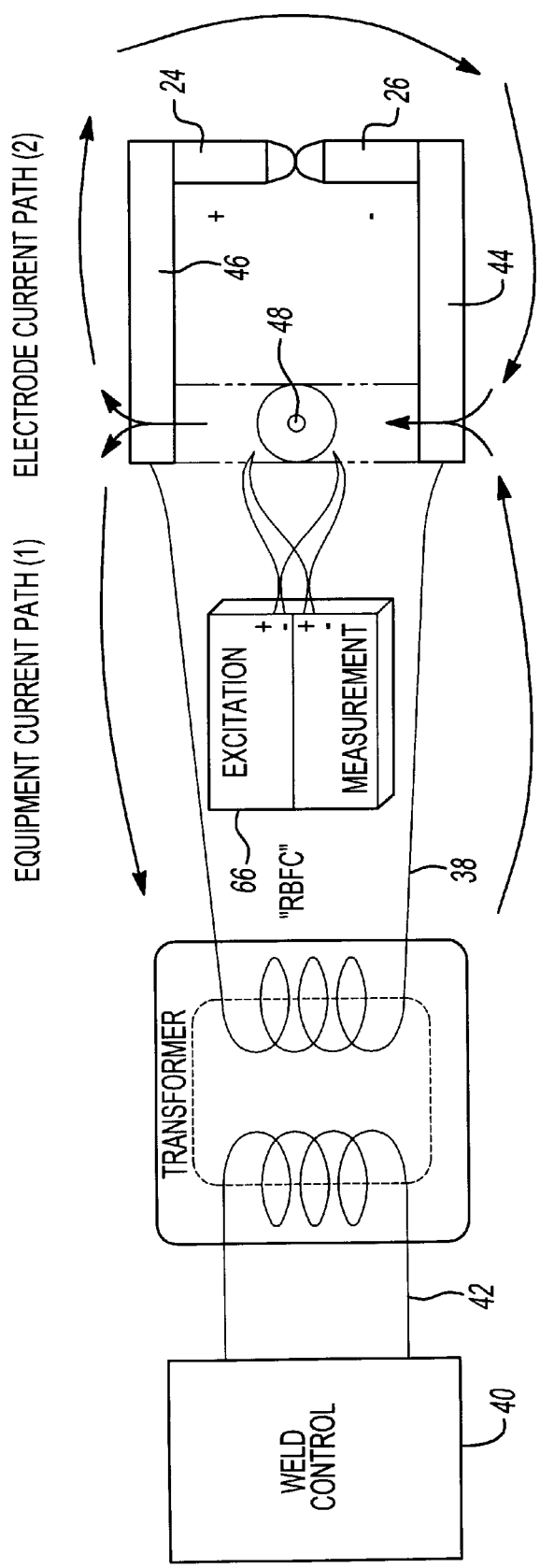

NO WAT WELDING SYSTEM

Applicant hereby claims priority based on U.S. application Ser. No. 09/557,896, filed on Apr. 21, 2000, which is a divisional of U.S. application Ser. No. 09/062,950, filed on Apr. 20, 1998 and issued as U.S. Pat. No. 6,066,824, which is a divisional of U.S. application Ser. No. 08/424,933, filed on Apr. 19, 1995 and issued as U.S. Pat. No. 5,742,022, and on U.S. Provisional Application Ser. No. 60/095,385 filed on Aug. 5, 1998. The complete disclosures of U.S. Pat. Nos. 6,066,824 and 5,742,022 and U.S. application Ser. Nos. 09/557,896 and 60/095,385, are hereby incorporated by reference.

FIELD OF THE INVENTION

The present invention relates generally to an improved resistance weld-based gun assembly for use in an electric welding system, and more particularly, to an assembly selectively including a resistance-based force control or a mechanical non-electrical closed loop coolant system to eliminate the need for plant-provided facilities.

BACKGROUND OF THE INVENTION

Resistance welding utilizes the flow of electricity to permanently join two or more overlapping metallic workpieces to one another. Typically, the metallic workpieces are placed between two opposing electrodes of an electric welding system gun assembly. The electrodes are then forced together until their tips contact the outer surfaces of the workpieces at a pressure sufficient to sandwich the workpieces and ensure an adequate electrical contact between the electrodes and the workpieces. Then an electrical current is induced to flow from one electrode tip to the other electrode tip by way of the sandwiched workpieces. The workpieces act as conductors in the resulting electrical circuit, and resistance to the flow of electrical current at the interfaces between the metals generates heat. The affected metal of each workpiece selectively becomes molten, and interacts with molten metal of an adjacent workpiece to form a weld nugget that permanently bonds the workpieces together at the point of electrode tip contact.

A number of factors relate to the creation of a weld nugget, including the force and area of contact between the electrode tips and workpieces, the level of current flow, the length of time that the current flow lasts, degree of workpiece imperfection, and even the condition of the electrode tips themselves.

The prior art teaches the importance of creating an adequate weld nugget. Therefore, weld systems are overconfigured to generate a weld nugget even if there are significant workpiece imperfections by having high force, current levels, and current application times. Yet, many resulting welds are still imperfect. Therefore, typically, 25% of all welds in a part are added to insure adequate structural integrity.

Further, such overcompensation for possible workpiece imperfection results in significantly higher deformation (mushrooming) of the electrode tips at the point of contact between the tips and the mating workpieces. If the electrode tips are inadequately cooled, the electrodes experience excessive tip wear, deformation, tip sticking and even tip melting, all of which contribute to poor weld quality and increased maintenance. The generation of significant heat at the electrode tips also results in significant heat built up in the welding control unit, transformer, and secondary (i.e., high current) cable disposed between the electrodes and the transformer.

Moreover, the application of continuous significant electrode force upon the sandwiched workpieces requires the use of significant sources of compressed air. The compressed air provides for the actuation of various air cylinders to position the welding gun electrodes with respect to the workpieces to be sandwiched therebetween and to generate force.

The use of complex air and water systems with their multitude of hoses and corresponding pipes, valves, and the like, in combination with the controllers and supply mechanisms, greatly increases manufacturing expense. It has been estimated that approximately 25% of the total cost of an electric weld system can be attributed to the use of external air and water-cooling circulation systems.

Typical electrical welding systems must be custom designed, built, and tested, requiring the services of numerous skilled trades. Following such testing by the supplier, the verified welding systems are then tom-down, transported, and rebuilt at the final manufacturing facility. Such intermediate steps significantly increase the time lag in providing a complete electric weld system. Moreover, both the design and testing facility, as well as the final manufacturing facility, must make significant capital and continuous investments in air and water-cooling circulation systems.

Nor is the problem limited to manufacturing of an electric weld system itself. The ongoing maintenance problems of requiring significant water-cooling and air circulation systems are extensive. It has been estimated that possibly over 80% of the down time of a typical electric welding system may be attributed to the host of air hoses, and feed and return cooling water hoses in combination with the corresponding pipes, valves, and the like.

There are additional costs to requiring complex water and air supply circulation systems. Each electric welding system becomes unique. Each length of hose, each bend in a pipe or conduit, and each selected placement for various cooling water fittings is necessarily tailored to the particular welding system. The kinematics of the host of hoses (pejoratively referred to as "spaghetti") cannot be accurately predicted or modeled. Accordingly, the robot movements in each work cell must be inputted on-site, step-by-step, to ensure that hoses do not become entangled. To further exacerbate the problem, the resulting "window" in which a robot arm may move to reach, for example, a weld point, is significantly reduced, again due to the proliferation of the compressed air and water hoses and associated components. Thus, the time to program a robot arm is extensive and the resulting process time to process workpieces is significantly increased.

In a manufacturing plant having a large number of electric welding systems, the aggregate cost in having to individually construct, install, and maintain each electric weld system is extensive. Accordingly, there is a need to provide an improved electric welding system that minimizes or eliminates one or more of the problems as set forth above.

SUMMARY OF THE INVENTION

The present invention is directed to an improved weld gun assembly for use in an electric welding system that includes various features to eliminate the need for external plant-based external air and water-cooling circulation systems with their attendant complexity, expense, and maintenance issues.

A first aspect of the invention includes a weld gun having opposing electrodes continuously separable through a predetermined range for providing welding current through at least two metallic workpieces. The weld gun includes a welding secondary circuit, including transformer secondary windings, in combination with a transformer and weld control, and an electrically actuated, electronically-controlled actuator operatively coupled to the weld gun. The actuator is capable of moving the electrodes to any one of a plurality of electrode separation distances, the electrodes adapted to contact the workpiece at carefully controlled force levels. Preferably, the electrodes contact a workpiece softly (i.e., with accurately controlled minimized force). For low work cycle welding, without cooling, no further features are required. For higher work cycles, a resistance-based force controller works in combination with a host control coupled to the actuator for controlling the actuator in accordance with predetermined criteria including a signal generated by the resistance-based force controller.

In operation, the actuator preferably includes a calibration step, wherein it is reset to zero with the opposing electrodes touching one another at a predetermined force level. At this point, the closed position secondary resistance value can be used to determine the condition of the electrodes. If necessary, a request for tip dress can be generated.

Preferably, the welding secondary circuit provides a highly conductive current path when the electrodes selectively engage the workpieces, wherein the workpieces are less conductive than the secondary circuit. Further, the resistance-based force controller preferably includes at least four leads, an excitation lead typically going to each of the electrode arms and a measurement lead also going to each of the electrode arms. In operation, the resistance-based force controller selectively excites the secondary circuit when the electrodes are not in contact with a workpiece, by applying a current through said secondary circuit by means of each excitation lead, and selectively measures a resistance of the secondary circuit by means of each measurement lead.

When a workpiece is about to be welded the force controller excites the secondary circuit and measures the total resistance of the secondary circuit and the resultant resistance of the workpiece conduit path after the actuator applies a predetermined force upon the workpiece. A calculated resistance of the workpiece conduit path is compared to predetermined criteria. If the resistance is not within the predetermined criteria, as for example, when a work piece has unexpected imperfections, the force controller selectively generates a signal to the actuator to adjust the predetermined force applied by the actuator to the workpiece by a predetermined increment. The iterative process continues until the predetermined criteria are met and the weld gun assembly then generates one or more welds. Alternatively, the force controller may continuously monitor and measure resistance (voltage drop) while the gun control continuously increases force. The force controller may interrupt the gun control when the appropriate value is achieved to generate a weld.

Significant advantages result. First, resistance value detection and control with dynamic optimization of weld parameters such as force, current, voltage and electrode displacement helps ensure consistent good weld nuggets. Thus, the number of weld nuggets needed for a particular part significantly decreases. Second, the use of resistance value detection to ensure that an adequate electrical circuit has been made between the two electrodes and the workpieces permits the use of a much lower electrode force application upon the workpieces. Such a lower force minimizes gun deterioration such as damage to the electrode tips, and gun mechanism. Third, expulsion, with its undesired loss of molten metal preferably used to create a weld nugget, is reduced. Fourth, having precise and infinite opening positions for the electrodes reduces cycle time. Fifth, electrode deformation is reduced, allowing higher current density with equal current. These and other advantages combine to allow successful welding at generated temperatures without the need for external facility based water-cooling.

Thus, the use of non-facility based isolated cooling mechanisms become possible even in "high work cycle" processes. One such mechanism comprises a reciprocating coolant heat extractor. The extractor includes a highly conductive coolant, a cylinder with an actuator such as a mechanically operated piston, a heat exchanger, and a closed loop system for the coolant that includes the actuator and the heat exchanger. In operation a piston moves in the cylinder upon operation of the weld gun assembly to circulate the coolant so that it picks up heat from a heat source and releases the heat through the heat exchanger.

Preferably, the piston is mechanically linked to the weld gun. A pivot point is created between the opposing and electrodes of the weld gun, and a mechanical linkage is then secured to the piston and the weld gun. A first end of the mechanical linkage is secured to a pivoting electrode and a second end is secured to the piston. The intermediate portion is secured to the pivot point between the electrode arms. The line containing the coolant includes various pathways and check valves to control the movement of the coolant as it removes heat from hot components and dissipates that heat.

A second non-plant based isolated cooling mechanism includes a bladder device. A check valve is disposed between a source of heat and a heat exchanger and a second check valve is disposed between the heat source and the bladder. As the coolant expands with the addition of heat, it flows from a heat source through the first check valve to the heat exchanger, the bladder expanding to accommodate the increased volume from the expanding coolant. The first check valve selectively closes upon termination of coolant expansion while the second check valve selectively opens to re-supply coolant under force from the bladder to the heat source.

A third non-plant based isolated cooling mechanism relies solely on the natural conduction and convection associated with the electrode arms themselves. Both the mass and the outer surface area of each arm is maximized in a region adjacent a receptacle adapted to receive an electrode so that the heat may be conducted away from the electrodes to an outer surface and dissipated through convection. To increase the surface area of the arms, a series of ribs or undulations having channels defined therebetween or openings within the arms themselves may be used.

BRIEF DESCRIPTION OF THE DRAWINGS

The features and inventive aspects of the present invention will become more apparent upon reading the following detailed description, claims, and drawings, of which the following is a brief description:

FIGS. 2A, 2B, and 2C are schematic views showing the use of the resistance-based force controller to determine secondary resistance.

DETAILED DESCRIPTION OF PREFERRED EMBODIMENTS

Figure 1:
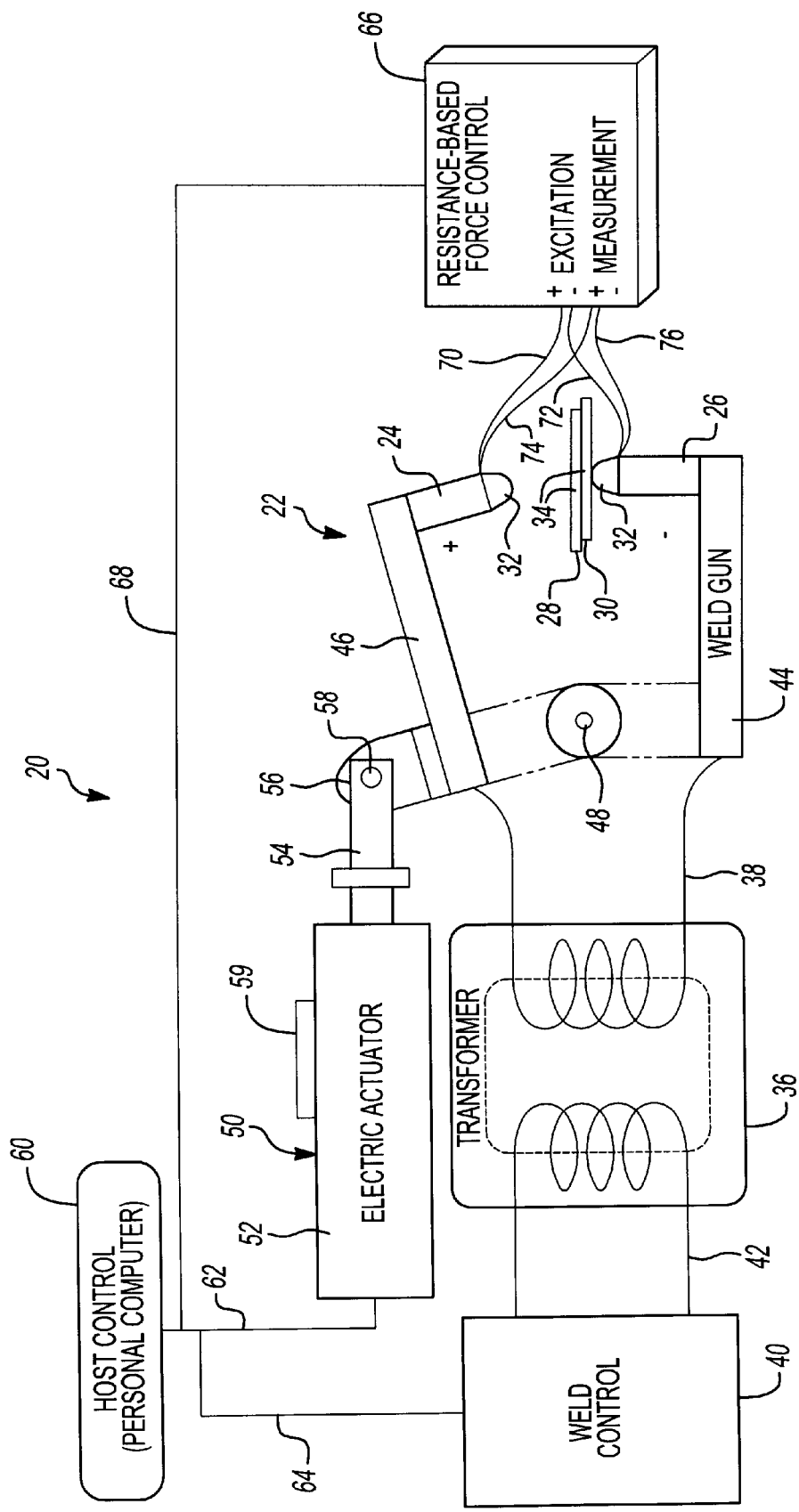
FIG. 1 is a schematic view of a weld gun assembly for use in an electric welding system with a resistance-based force controller.

The present invention relates to an improved resistance weld-based gun assembly 20 for use in an electric welding system, as illustrated in FIG. 1. For ease of understanding, the various key elements are shown by means of a schematic representation and components not essential to the claims that follow have been eliminated. However, detailed information about specific elements that could be incorporated into a possible embodiment of a weld-based gun assembly 20 including specific information about one or more embodiments of a host control, weld control, electric actuator system, transformer, and weld gun may be found in co-pending application Ser. No. 09/062,950, now U.S. Pat. No. 6,066,824, the entire specification of which is hereby incorporated by reference and augmented by the description that follows.

Assembly 20 is adapted to perform a resistance welding operation. It includes a weld gun 22 having opposing and electrodes 24 and 26 continuously separable through a predetermined range for selectively providing welding current through at least two workpieces 28 and 30. Each electrode 24 and 26 terminates at an associated tip 32 that contacts an outer surface 34 of the respective workpieces 28 and 30.

Assembly 20 includes a transformer 36 for providing welding current to electrodes 24 and 26 as shown by secondary circuit line 38. In turn, a weld control 40 is operatively connected to transformer 36 as shown by line 42.

Weld gun 22 includes a fixed arm 44 to which electrode 26 is attached and a pivotable arm 46 to which electrode 24 is attached, arm 46 pivoting with respect to arm 44 about a fixed pivot point 48. An electrically—actuated electronically—controlled actuator 50 includes a fixed cylinder 52 and a linearly movable piston 54, a free end 56 of which is pivotally connected to arm 46 by means of a pivot point 58. Actuator 50 is capable of moving electrode 24 to any of a plurality of predetermined separation distances with respect to electrode 26. Actuator 50 includes a transducer 59 that measures the relative movement of piston 54 within cylinder 52 for process monitoring such as interactively calculating the displacement of the tips of electrodes 24 and 26. Actuator 50 is also capable of accurately and repeatably and accurately applying a predetermined force to workpieces 28 and 30 sandwiched between electrodes 24 and 26. As discussed below, actuator 50 minimizes the force applied while actually improving the quality of the weld. Only one acceptable actuator 50 is illustrated. As recognized by those skilled in the art, other acceptable actuators include linear motors, robotic arms, ball and screw systems, hydraulic systems, pneumatic systems, and cam-driven systems.

Both actuator 50 and weld control 40 are operatively connected to a host control 60. Host control 60 may be a personal computer. Host control 60 utilizes software/firmware and works in combination with the various units in communication with it including force, current, voltage, displacement and resistance sensors to permit dynamic detection and continuous optimization of weld parameters (e.g, force, current, and weld time) for quality welding with minimized heat output.

A resistance-based force control 66 is also operatively connected to host control 60 by means of a line 68. Control 66 includes at least four leads 70, 72, 74 and 76. As illustrated, excitation leads 70 and 72 go to portions of arms 46 and 44 near electrodes 24 and 26, respectively, while measurement leads 74 and 76 go to portions of arms 46 and 44 near electrodes 24 and 26, respectively. Preferably, leads 70 and 74, and leads 72 and 76 terminate at the same portions of arms 46 and 44.

As best shown in FIGS. 2A and 2B, a secondary circuit 78, including transformer secondary windings, is typically defined by an equipment current path 80. Path 80 is defined from the termination of leads 70 and 74 through a portion of arm 46, line 38 into transformer 36, a portion of arm 44, and terminating at leads 72 and 76. Preferably, secondary circuit 78 is more conductive than workpieces 28 and 30. The placement of leads 70, 72, 74, and 76 between controller 66 and weld gun 22 is merely illustrative in the figures so long as they form a portion of the secondary circuit 78. Moreover, while controller 66 is shown separately for purposes of explanation, it does not have to be a separate controller. For example, its functions can be incorporated into either host control 60 or weld control 40.

Typically, a welding operation relies on alternating current ("AC"). However, when the force controller 66 is used as noted above for calibration, direct current ("DC") is typically used. Thus, one of the electrodes 24, 26 takes on a negative polarity while the other electrode takes on a positive polarity.

In traditional resistance welding systems, weld forces are excessive. They are specified based upon worst-case welding scenarios in which the workpieces to be welded must first be bent to put them into contact before the welding force begins to affect the resistance at the surface interface between the workpieces.

The present invention avoids the problems of the prior art by measuring resistance to determine an optimum weld force. There are a number of advantages to reducing weld force including extended electrode life, particularly in uncooled conditions, and lower actuator requirements. With lower actuator requirements, equipment and operating costs are significantly reduced. An electrically actuated, electronically controlled actuator 50 becomes feasible as opposed to a more traditional compressed air actuator relying on a facility-based air circulation system. Weld force reduction can also limit indentation of the product and improve weld quality. Further, resistance value detection and control with dynamic optimization of weld parameters such as force, current, voltage, and electrode displacement greatly increases the probability of good welds. Therefore, fewer welds need to be attempted to achieve structural integrity. It has been estimated that approximately 25% of welds are added to a workpiece as insurance. It is anticipated that the invention will result in consistent weld nugget formation and elimination of the expulsion of molten metal. Further, through precise and infinite tip positioning of electrodes 24 and 26, cycle time will be reduced.

Most importantly, however, these various improvements cumulatively allow successful welding at generated temperatures without the need for external facility-based water-cooling and air circulation sources with their associated lines and hardware when attached to the weld gun assembly. Thus, weld gun assemblies 20 according to the present invention may be constructed at greatly reduced cost with less complexity. It has been estimated that up to 25% of the total cost of a weld gun assembly is related to the need for air and water-cooling lines and their installation. Maintenance problems with air and water lines are among the greatest sources of weld gun assembly downtime. These are eliminated. There are utilities costs associated with maintaining external sources of air and water. These are also eliminated. Further, the elimination of the air and water-cooling lines greatly enhances robot programming and weld gun maneuverability.

The process works generally as follows and as illustrated in FIGS. 2A, 2B, 2C and by means of the flowchart in FIG. 8. First, as shown at point 90 of FIG. 8 and in FIG. 2C, electric actuator 50 performs a re-zero with electrodes 24 and 26 touching one another with a predetermined force level. At this point, the resistance based force control 60 excites the secondary circuit 78 using leads 70 and 72. The resistance of the secondary circuit 78 is measured using measurement leads 74 and 76. The resistance value in the closed position, shown in FIG. 2C, is used to determine the condition of the electrodes 24 and 26, and compared to predetermined resistance values to determine if a request for tip dress should be generated.

Figure 8:
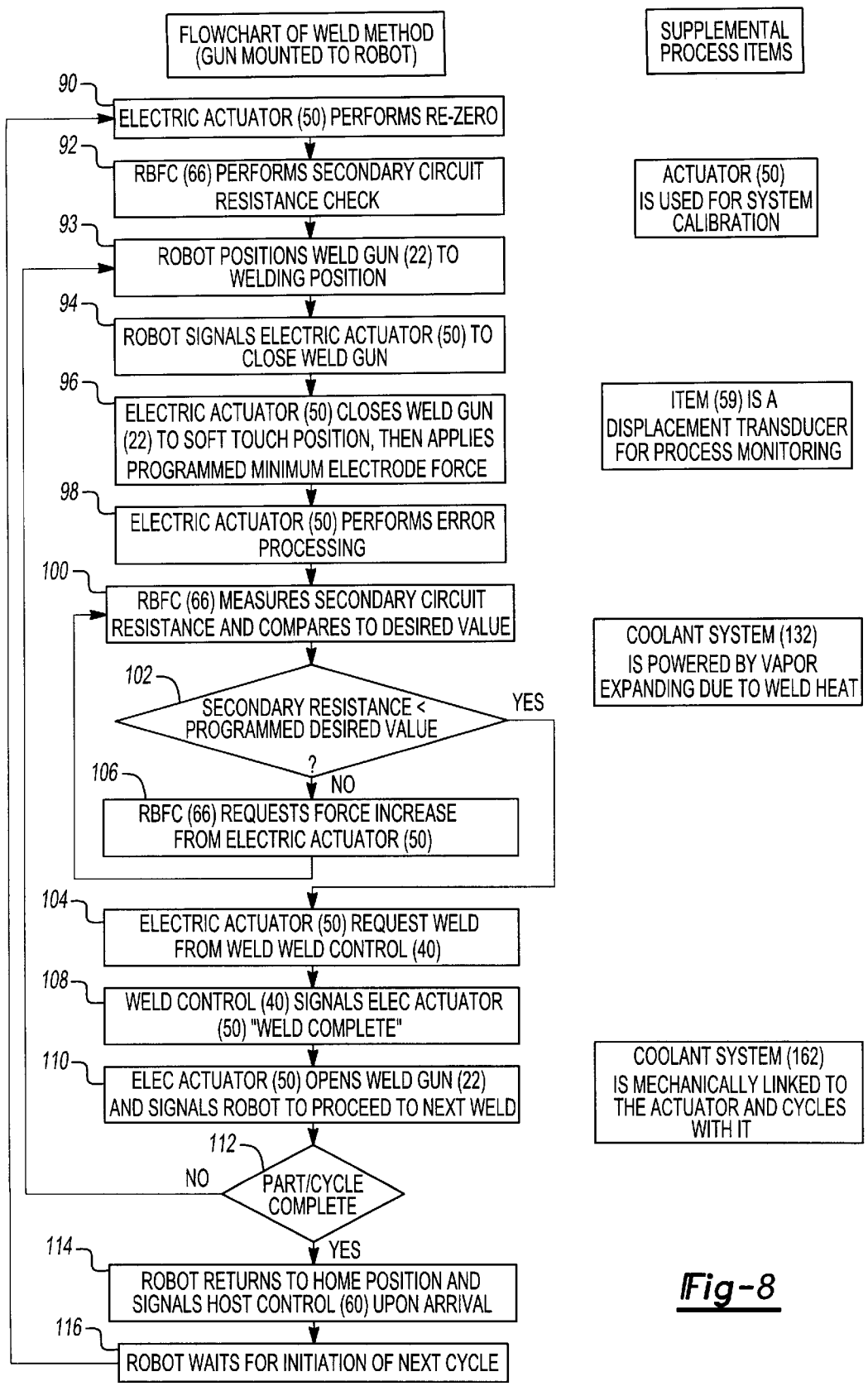
FIG. 8 is a flow chart concerning the operation of the present invention.

As shown at point 92 of FIG. 8 and in FIG. 2A, control 60 communicates with resistance based force control 66 to excite the secondary circuit 78 using leads 70 and 72. The resistance of the secondary circuit 78 with electrodes 24 and 26 both separated from one another is measured using measurement leads 74 and 76. The resistance of the secondary circuit 78 may increase with changes in temperature. If so, then calibration may need to occur when there is an increase in temperature after so many welds. The resistance value in this open position (FIG. 2A) may be used in conjunction with other resistance measurements to calculate or establish required or desired resistance values.

Next, as shown at steps 93, 94, 96 and 98, the robot (not shown) first positions weld gun 22 in an appropriate welding position. Then actuator 50 closes weld gun 22 such that tips 32 of electrodes 24 and 26 apply a programmed minimum force on workpieces 28 and 30. One possible minimum force is 50 pounds, although cycle times may be shortened if the initial force is set at or near the force used for the previous weld, as may be stored in host control 60. Actuator 50 will confirm that the appropriate minimum-programmed force has been achieved. The concept of a force detection means is discussed in greater detail in the application incorporated by reference, above. However, it includes a load cell that is operationally coupled to weld gun 20 for the detection of force between electrodes 24 and 26. The load cell (not shown) generates a force signal indicative of the detected force and communicates that signal to control 60.

Once the minimum-programmed force is achieved, control 66 again excites the secondary circuit 78 as shown in FIG. 2B and at point 100 of FIG. 8. Measurement leads 74 and 76 again measure the resistance. However, the resistance measured is that of the welding equipment defined by secondary circuit 78 in parallel with workpiece current path 80. Workpiece current path 80 is defined as the electrical circuit created by electrodes 24 and 26 in combination with workpieces 28 and 30. By using the resistance value determined in FIG. 2A, host control 60 can calculate the resistance of the workpieces 28 and 30 according to the following well-known formula:

$$R_T = (R_1 \cdot R_2)/(R_1 + R_2)$$

where $R_T$ is the combined resistance of the secondary circuit and the workpiece current path (as measured), $R_1$ is the resistance of the secondary circuit (as measured), and $R_2$ is the resistance of the workpiece current path (as calculated). Of course, if additional resistances must be measured, the equation may be modified as known to those skilled in the art based upon the formula $R_T = 1/((1/R_1)+(1/R_2)+(1/R_N))$ or similar formulas depending on whether the elements are in parallel, series, or a combination thereof. Moreover, the various resistances can be recalculated as required over time as noted above. For example, as the tips of electrodes 24 and 26 begin to wear but not to the point where tip dressing is required, there is an enlarged area of contact between the electrodes and workpieces 28 and 30. The resistance change can be compensated for and shall result in incrementally increased welding current over time.

If the resistance of workpieces as calculated is close enough to a predetermined target value as shown at decision point 102, welding begins by electric actuator working in communication with host control 60 and weld control 40 at point 104 to create a weld nugget. If not, as shown at point 106, resistance-based force control communicates with control 60 such that the force being applied to the workpieces 28 and 30 by means of actuator 50 is appropriately adjusted by a predetermined increment. The process cycles back to point 100 and repeated until the target resistance value is reached.

While an iterative process has been illustrated using control 60, it should be recognized however, that other approaches such as a non-iterative analog process may also be utilized. Under such a non-iterative analog approach, the force control 60 would continuously monitor and measure resistance (voltage drop) while force is continuously increased upon workpieces 28 and 30 until an appropriate value is reached. Once the value is reached, the force control 60 is isolated and a weld generated.

Once the weld is completed, then at point 108, weld control 40 signals actuator 50. Actuator 50 opens weld gun 22 and signals the robot to proceed to the next weld location as shown at point 110. As shown at decision point 112, if the welding of the part represented by workpieces 28 and 30 is not complete, then the process cycles to point 93 and the robot (not shown) positions the weld gun 22 to the next welding position. Otherwise, if the welding of workpieces 28 and 30 is complete, then the robot returns to its home position and signals host control 60 upon arrival as shown at point 114. Finally, the robot waits for initiation of the next cycle at point 116, and the cycle begins again at point 90.

There are a number of important characteristics to resistance-based force control 66. First, the control must be isolated electrically from secondary circuit 78 during welding to prevent damage to the circuitry of the control. If the isolation is accomplished with physical switches, then contact resistance is a concern. However, if semiconductor devices are considered, then the circuit design must accommodate non-linearity and current leakage. Second, control 66 must provide stable excitation at low voltage, high current levels (e.g., 10–100 amps) for resistance measurements. Third, control 66 must be able to sense even very small changes in resistance on the order of micro-ohm levels. Fourth, control 66 must reject electromagnetic interference ("EMI") in order to resolve low-level signals. In practice, it is anticipated that control 66 will include either a commercial micro-ohmmeter, or a custom built circuit including a high-end power supply, and precision, low-resistance Wheatstone Bridge with appropriate shielding, or similar device to measure low resistances.

To further assist in the removal of unwanted heat from assembly 20, weld control 40 and transformer 36 are preferably air-cooled through the use of heat sinks. Thus, no cooling water is used to cool these power electronic devices.

Figure 3:
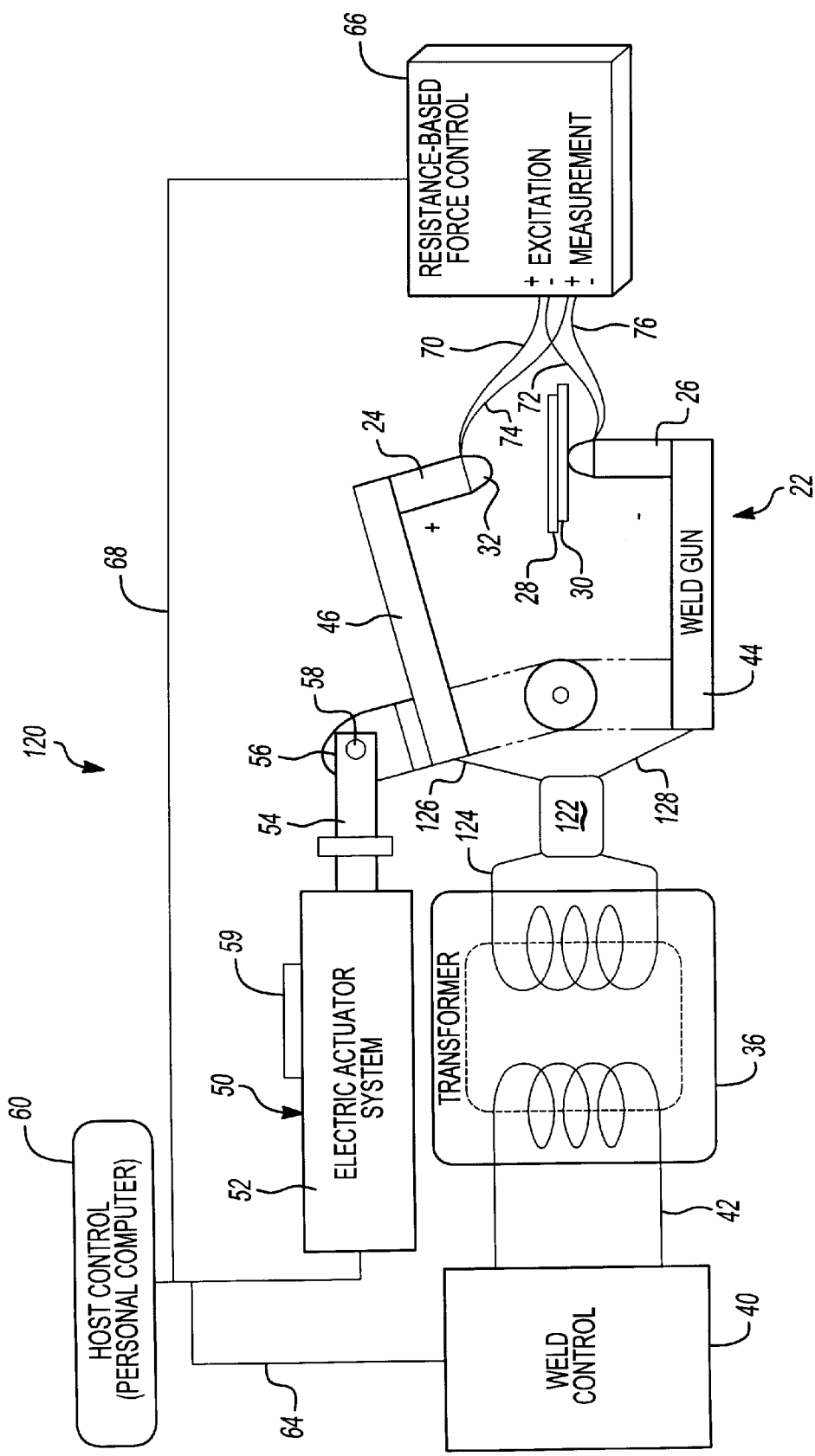
FIG. 3 is a schematic view of a second embodiment of a weld gun assembly for use in an electric welding system with a resistance-based force controller and further including an air-cooled jumper cable within the secondary circuit.

A second embodiment of the present invention, a weld gun assembly 120, is illustrated in FIG. 3. Weld gun assembly 120 is similar to assembly 20, but includes an air-cooled kickless or jumper cable system 122 with a heat exchanger disposed between transformer 36 and weld gun 22. Secondary current cables 124, 126, and 128 are cooled by ambient air to remove unwanted heat from the assembly during weld gun operation. Such an item is optionally incorporated into the weld gun assembly when gun size or weight dictate the use of a remote mounted transformer and to further assist in the removal of unwanted heat from the assembly without the need for an outside cooling system relying on hoses and plant facility utilities such as water.

As long as the weld gun assembly of the present invention is used in a "low work cycle" environment, the use of a resistance-based force control 66 in combination with the dynamic control of the welding parameters indicated above, and the ambient cooling of transformer 36 and the secondary current cables, is generally sufficient to provide quality welding with minimized heat output. However, when the weld gun assembly is used in a "high work cycle" environment, the present invention includes the additional step of utilizing a mechanical, non-electrical closed loop coolant system to pump highly conductive coolant selectively through high current components of the electric welding system. Advantages of such closed loop coolant systems are that they are physically contained within the weld gun assembly and are self-circulating as discussed in more detail below. Therefore, no external connections are required to plant facility utilities. The coolant systems that follow are each electrically isolated from the electrical system of the weld gun assembly.

Figure 4:
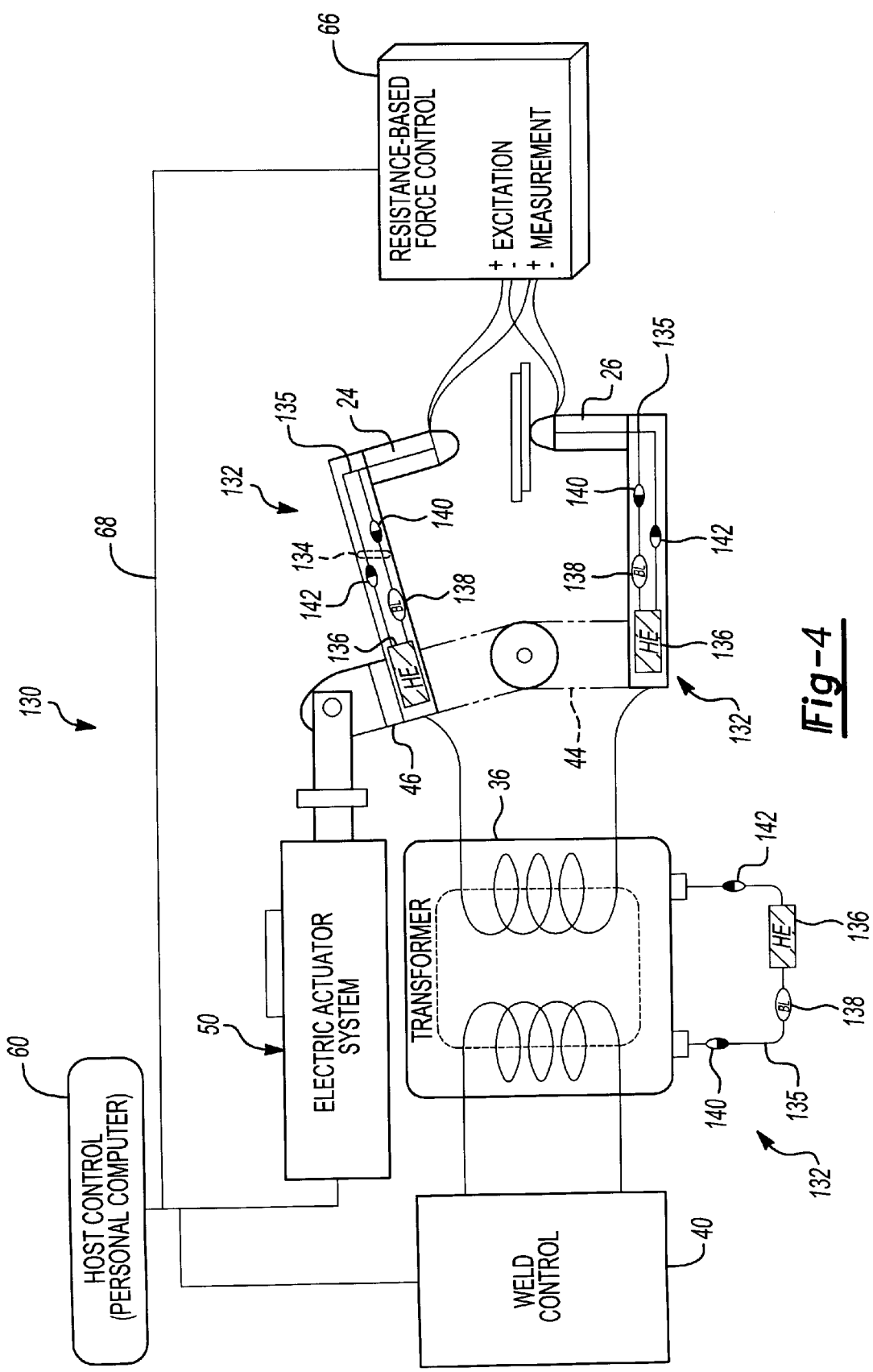
FIG. 4 is a schematic view of a third embodiment of a weld gun assembly for use in an electric welding system with a resistance-based force controller and further including a closed loop coolant system for both the transformer and each of the electrodes.

One such closed loop system is illustrated in the weld gun assembly 130 as illustrated in FIG. 4. Assembly 130 is very similar to the assembly illustrated in FIG. 1, but includes a separate closed loop coolant system 132 for electrodes 24, 26 and transformer 36. These three components typically generate the most heat by means of the high current load to which they are subjected during weld gun operation. It is also envisioned that a single system 132 may be used for all three components, although there are three separate cooling systems illustrated in the figure.

Coolant system 132 is based on the concept of circulating cooling fluid by the effect of vapor expansion due to weld current induced heat. Each coolant system 132 includes a highly conductive coolant 134, contained within a line 135, which expands upon the addition of heat. System 132 further includes a heat source to be cooled, a heat exchanger 136, a mechanical pump comprising an elastic bladder 138, and at least two one-way check valves, 140 and 142, all disposed within line 135. In operation, when heat is generated by one of the electrodes 24, 26 or the transformer 36, the coolant expands. The expanding coolant flows from the heat source through check valve 140 and into bladder 138. From bladder 138, coolant 134 selectively passes into heat exchanger 136 where most of the heat is dissipated. Bladder 138 is elastic and designed to expand against a bias as required to accommodate the increased volume from the expanding coolant. The first check valve 140 selectively closes upon termination of the coolant expansion i.e., once a weld is complete). Then the second check valve selectively opens to re-supply coolant under force from the bladder 138 to the heat source as the bladder returns to its unbiased configuration. Check valves 140 and 142 help ensure that coolant 134 only moves in a single direction through line 135. Preferably, coolant 134 is selected such that it is vapor-like in an expanded heat state and fluid-like in a cooled state.

Figure 5:
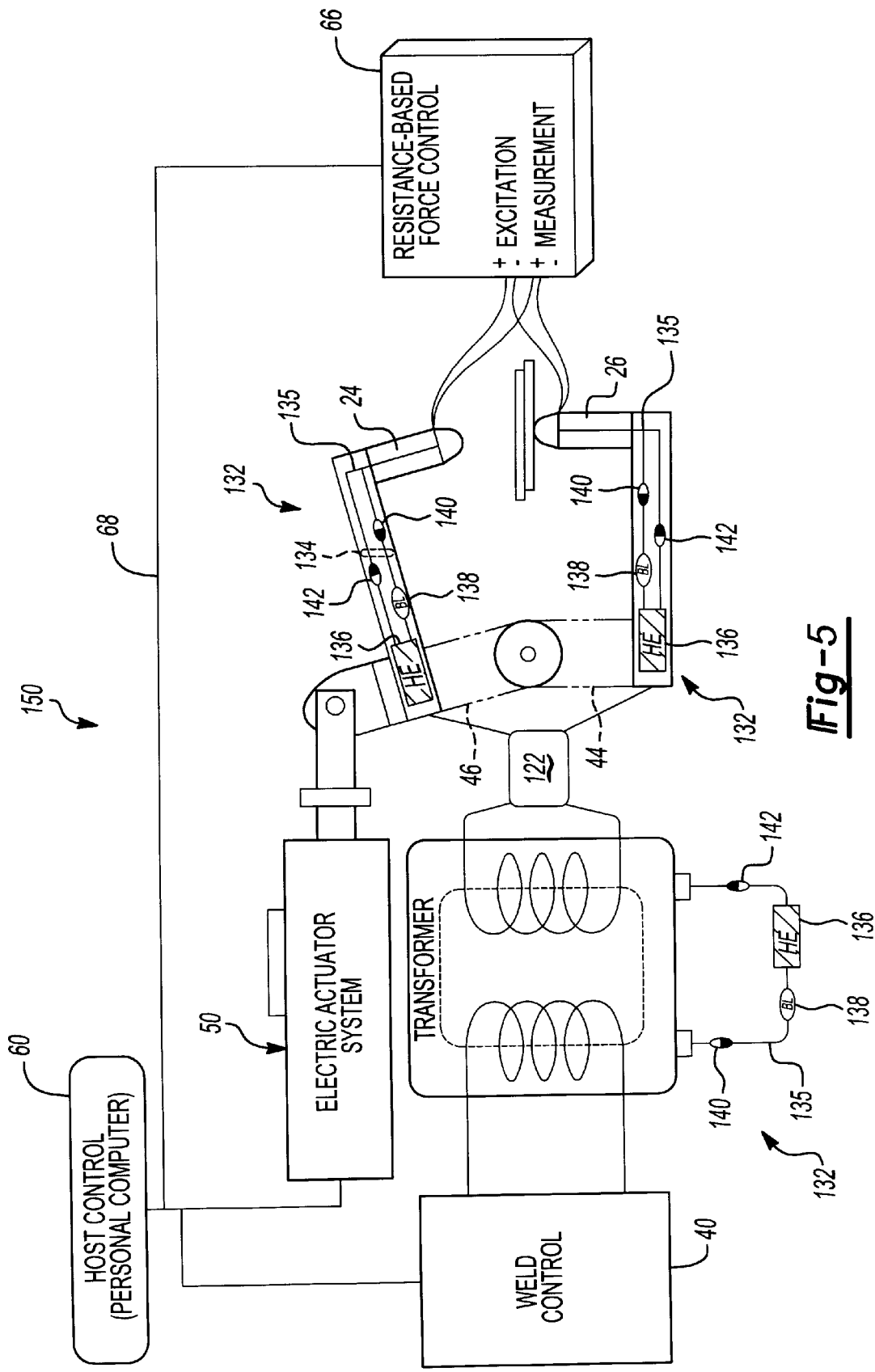
FIG. 5 is a schematic view of a fourth embodiment of a weld gun assembly for use in an electric welding system with a resistance-based force controller and further including a closed loop coolant system for both the transformer and each of the electrodes as well as an air-cooled jumper cable.

FIG. 5 discloses a weld gun assembly 150. Assembly 150 is very similar to the assembly illustrated in FIG. 3, but includes a separate closed loop coolant system 132 for arms 44, 46, and transformer 36 as discussed above.

Figure 6:
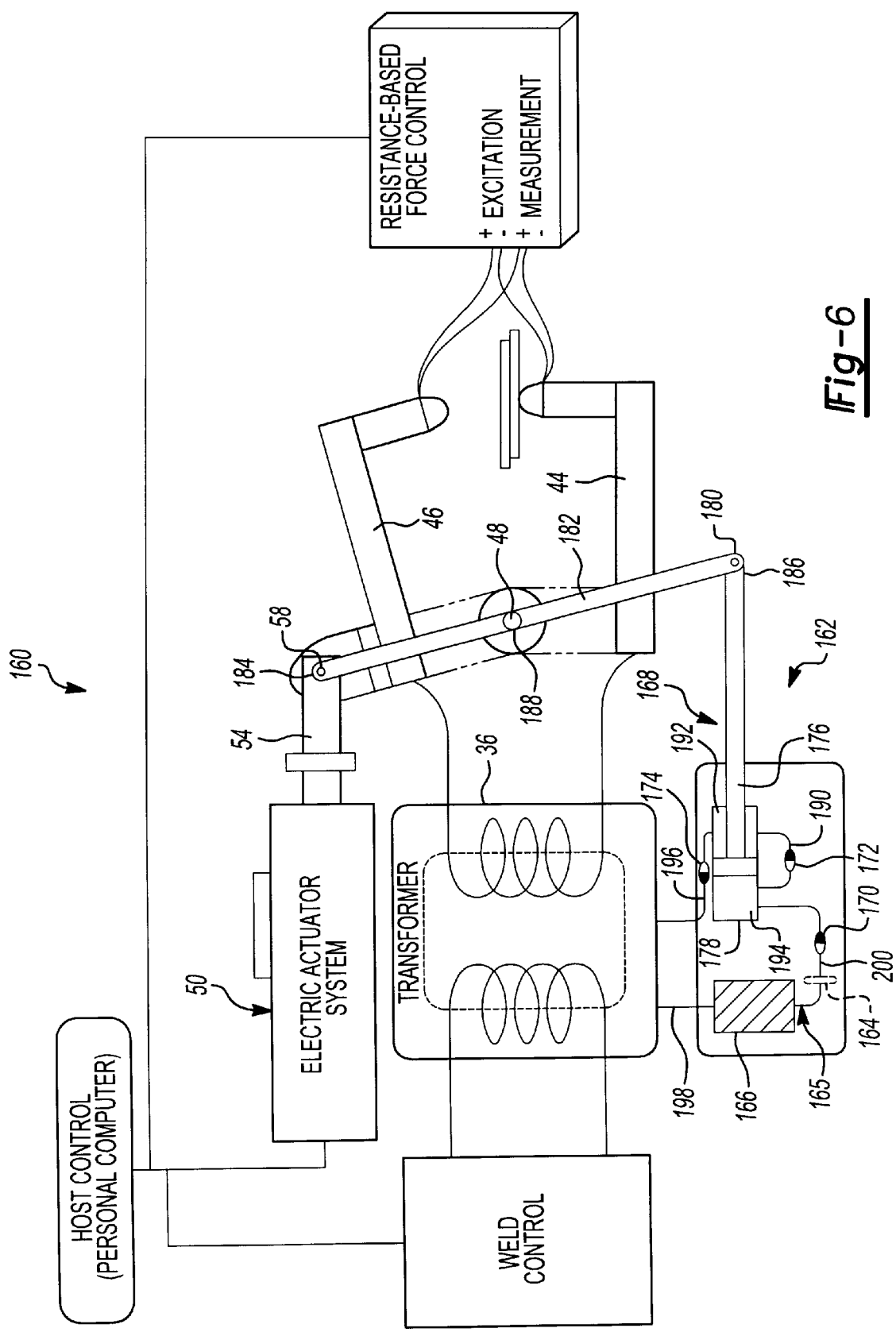
FIG. 6 is a schematic view of a fifth embodiment of a weld gun assembly for use in an electric welding system with a resistance-based force controller and further including a closed loop coolant system for the transformer based on mechanical movement of the weld gun actuator

FIG. 6 discloses a weld gun assembly 160 with a different embodiment of a closed loop coolant system 162 based on the concept of having a reciprocating slush core heat extractor. Coolant system 162 includes a highly conductive coolant 164 within a line 165, a heat source to be cooled (e.g., a transformer 36), a heat exchanger 166, a mechanical pump comprising an actuator 168, and a plurality of one-way check valves 170, 172, and 174 disposed within line 165. Mechanical actuator 168 includes a piston 176 reciprocal within a cylinder 178. Piston 176 is mechanically linked to movable arm 46 and piston 54 of actuator 50 at an outer end 180 by means of a second mechanical linkage 182.

Linkage 182 is preferably linear and pivotally secured to pivot point 58 of actuator piston 54 at a first end 184 and pivotally secured to outer end 180 of piston 176 at a second end 186. An intermediate point 188 is pivotally secured to fixed pivot point 48 between arms 44 and 46 of weld gun 22.

Line 165 includes a first coolant pathway 190 disposed between a first end 192 of cylinder 178 and a second end 194 of cylinder 178. Check valve 172 is disposed within pathway 190 to permit movement of coolant 164 from end 194 to end 192. A second coolant pathway 196 is disposed between the heat source, transformer 36, and first end 192 of cylinder 178. Check valve 174, disposed within second pathway 196, permits movement of coolant 164 from first end 192 into the heat source. A third coolant pathway 198 is disposed between the heat source and heat exchanger 166. Finally, a fourth coolant pathway 200 is disposed between heat exchanger 166 and second end 194 of cylinder 178. Check valve 170, disposed within fourth pathway 200, permits movement of coolant 164 from heat exchanger 166 into second end 194 of cylinder 178.

In operation, closed loop coolant system 162 works as follows. As piston 54 of actuator 50 moves from a rest position, wherein electrodes 24 and 26 are separated, to an activation position, wherein electrodes 24 and 26 contact workpieces 28 and 30, piston 176 of mechanical actuator 168 moves from first end 192 of cylinder 178 towards the second end 194. Fluid flows through first coolant pathway 190 from second end 194 by way of check valve 172 into the first end 192 bypassing both transformer 36 and heat exchanger 166. When piston 54 moves from the activation position to the rest position, however, piston 176 moves from the second end 194 to the first end 192. Coolant 164 is forced from the first end 192 through the heat source by way of pathways 196 and 198 into heat exchanger 166. From heat exchanger 166, coolant 164 flows into second end 194 of cylinder 178. Thus, heat is removed from the heat source by way of heat exchanger 166 as actuator moves from its activation position to its rest position after a weld has been made. Preferably, coolant 164 is selected such that it is vapor-like in an expanded heat state and fluid-like in a cooled state.

Figure 7:
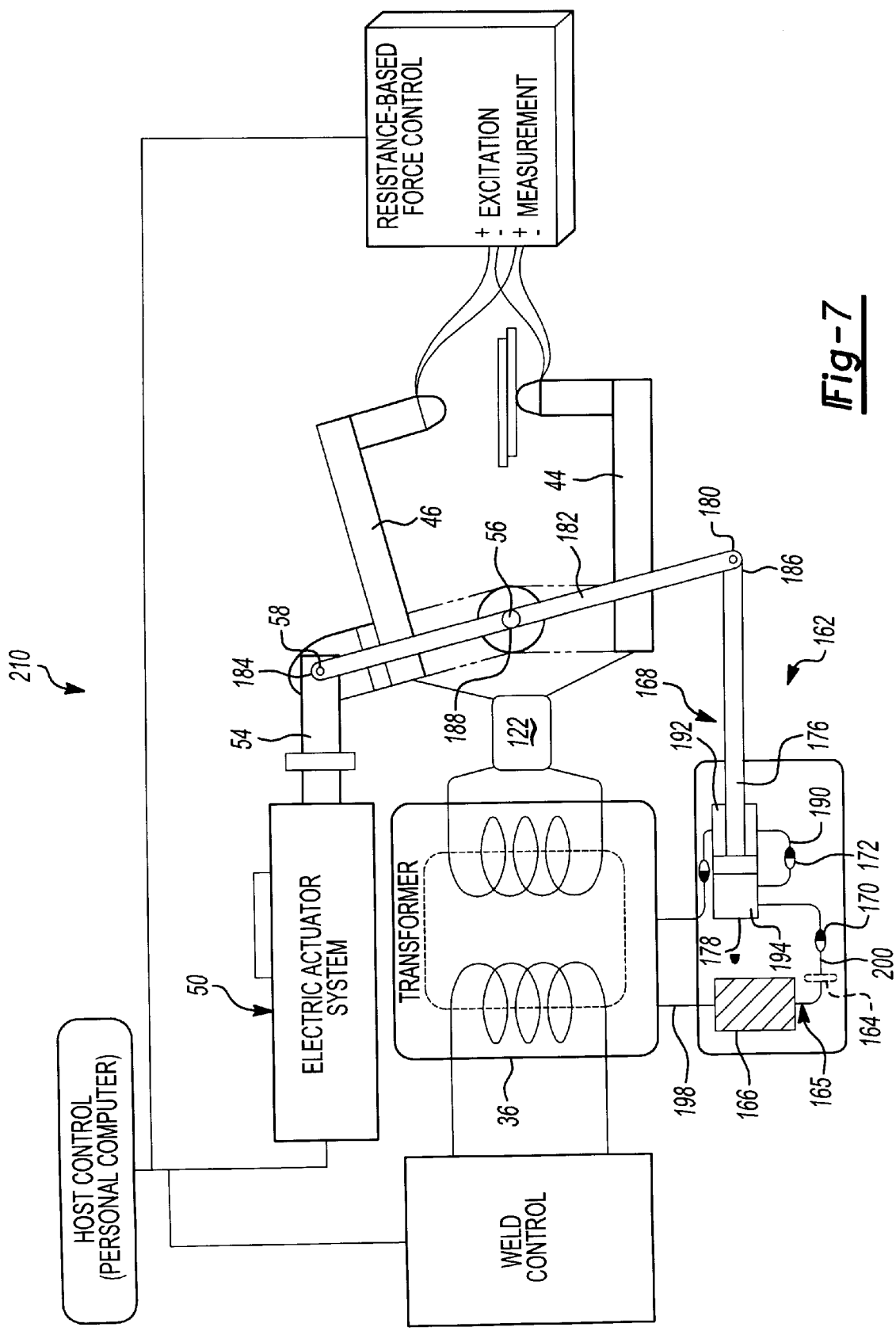
FIG. 7 is a schematic view of a sixth embodiment of a weld gun assembly for use in an electric welding system with a resistance-based force controller and further including a closed loop coolant system for the transformer based on mechanical movement of the weld gun actuator as well as an air-cooled jumper cable.

The weld gun assembly 210 illustrated in FIG. 7 operates in the same fashion as illustrated in FIG. 6. However, assembly includes air-cooled jumper cable system 122.

Only one embodiment of closed loop coolant system 162 is illustrated. It is envisioned, however, that actuator 50 may provide cooling to one or more high current areas of the weld gun system using any of a variety of mechanical connections. An advantage of such an approach is to provide required internal cooling to the weld gun assembly while avoiding the need for a plant facility cooling system such as one based on water, as discussed in detail above.

FIG. 8 illustrates the flow-chart showing the use of the resistance-based force control 66. However, it also shows various supplemental process items of the present invention. These items include the use of actuator 50 for initial system calibration, the use of transducer 59 for displacement monitoring and the use of both coolant systems 132 and 162 as discussed above.

Figure 9:
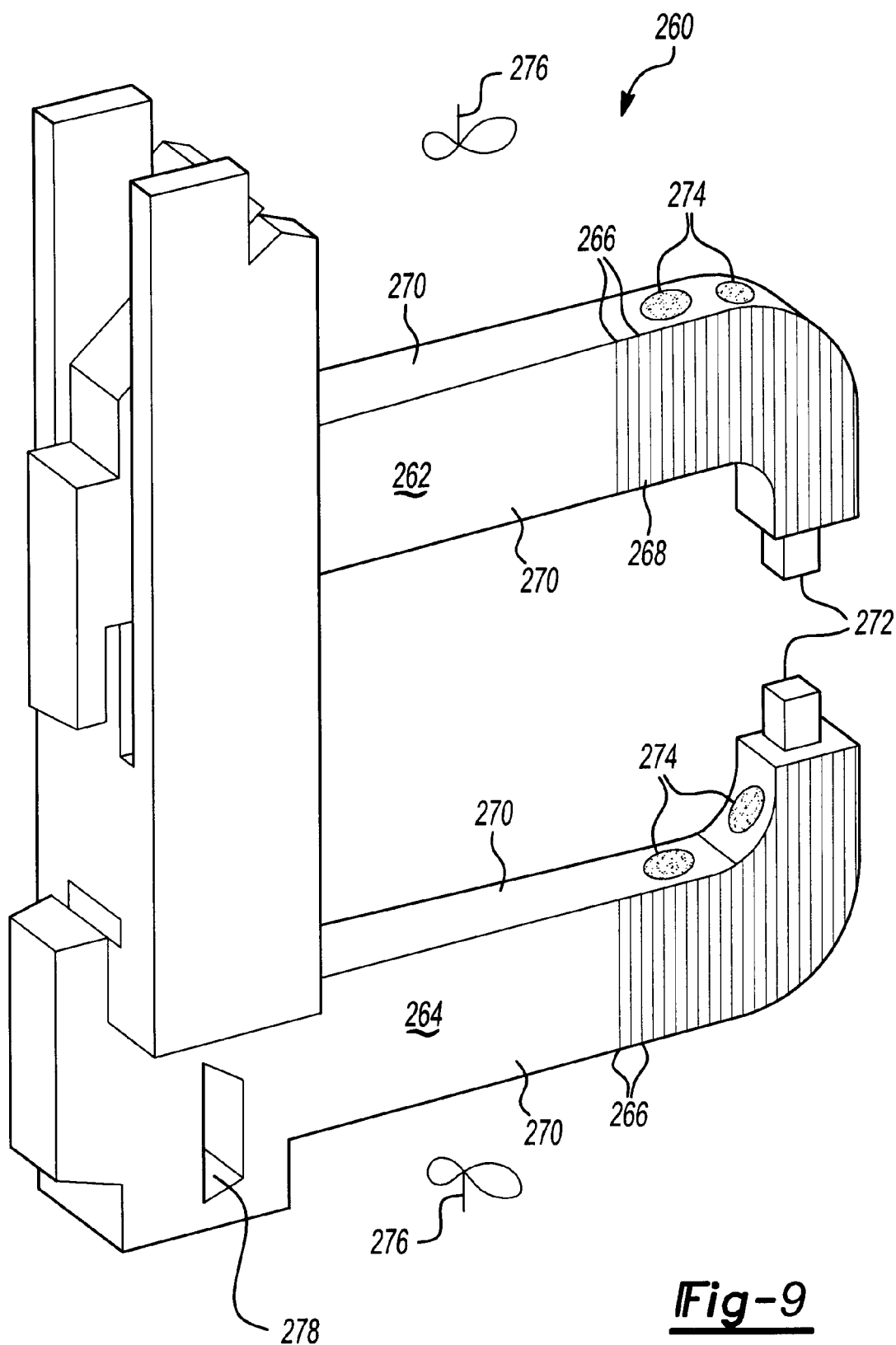
FIG. 9 is a portion of a weld gun assembly including grooves and openings to provide additional surface area to promote convection.

FIG. 9 shows the use of a welding gun assembly 260 with opposing electrode arms 262 and 264 relying solely on natural convection, conduction and radiation with the atmosphere for cooling. Gun assembly 260 reaches equilibrium and maintains that equilibrium well beyond 6,000 welds without failure under normal welding conditions. Moreover, contrary to teachings in the prior art that insist that complex water cooling systems are required, natural convection is by far the most important element related to gun assembly heat dissipation so long as sufficient electrode arm material exists to support conduction of heat from the electrodes to outer surfaces for convection. The role of radiation on heat dissipation is minimal.

Therefore, to promote the natural effects of convection, gun assembly 260 includes a plurality of ribs 266 or undulations having channels 268 defined therebetween along an outer surface 270 to increase the surface area of the gun adjacent the electrodes and the rate of convection. Surface area needs to be maximized to the extent possible in a region adjacent receptacles 272 that receive electrodes. Convection plays less of a role in cooling as the distance from the electrodes increases.

Vertically extending channels formed between adjacent ribs provide greatly improved convection as opposed to horizontally extending ribs. However, the main purpose of the ribs is to improve convection by increasing available surface area. The ribs themselves may be extended to represent fin like elements.

Assembly 260 also includes a plurality of openings 274 in each electrode arm. The openings also increase the surface area available for convection. The openings may extend through the entire arm or terminate at various locations within the arm, thereby forming bore holes. The number and extent of the openings rely in large part on the required structural integrity of the arm that is to be maintained in combination with the need for sufficient material to provide necessary conduction. It has been found, however, that less material is required if the heat has to travel less distance before convection begins.

To address the role of conduction in dissipating heat to the outer gun assembly surfaces, both upper and lower electrode arms 262 and 264 have generally similar mass, and the mass is preferably greater than that of traditional guns near the electrodes, particularly near the electrodes. By having each electrode arm with similar masses, thermal balancing of assembly 260 is greatly enhanced, minimizing the likelihood of system failure. The increased mass is required to provide adequate conduction to the outer surfaces so that convection may take place. A preferred electrode arm material is copper.

In cases where natural convection is insufficient, assembly 260 may include one or more fans 276 that blow air across ribs and channels to further promote heat dissipation. Opposing fans are often recommended since the placement of workpieces interrupt the flow of air. In addition to fans, electrode arms 262 and 264 continuously open and close between welding cycles to further promote convection. The arms themselves may include blades 278 to increase the convection currents.

A rough estimate follows for the required vertical area for a natural convection cooled weld gun. The major assumptions are that the energy from the input welding schedule can be averaged over a time period; the input energy is assumed to act on the entire vertical surface area of the gun assembly, and a steady state exists.

The input energy is equal to the square of the current multiplied by the total resistance multiplied by the time the current acts, namely $E=I^{**}2^{*}R^{*}t$ (Joules), where R is assumed to be 0.001 ohms. A typical welding schedule has the current applied for a short time, followed by a longer time of no current. The pattern repeats for a number of cycles, then a much longer time exists in which no current passes (e.g., part movement in and out of the gun assembly). A "period" can be defined as the total time in which the several welds occur, the first part is removed, and the next part is inserted, ready to begin the cycle again. When the input energy is averaged over a time period, and the schedule includes many periods, the input energy can be considered a steady state power input at a sufficiently large time (Note that power in Watts=Joules per second).

In the first example weld schedule, the cycle includes 9,000 amps acting for 0.13 seconds with one weld occurring every 4.43 seconds. Therefore, no current is passed between 0 and 4.3 seconds, then 9,000 amps are applied between 4.3 and 4.43 seconds. The period is 4.43 seconds long. Therefore, $E=9,000^{**}2^{*}0.001^{*}0.13=10,773$ Joules. The average power over the weld schedule of 4.43 seconds $Q=10,773/4.43$ seconds$=2,432.8$ Watts.

The required area to balance the input energy in a steady state is $A=Q/h(T_w-T_a)$ where Q is the stead state power input, h is the natural convection coefficient (for a vertical wall), Tw is the maximum allowed temperature of the vertical wall and Ta is the ambient temperature of the air. For the example, the Tw is assumed to be 250 degrees Celsius and Ta is assumed to be 23 degrees Celsius. Therefore, $A=2431.8/20(250-23)=0.54$ square meters or approximately 5.8 square feet.

The same approach may be applied to a second example welding schedule given by the following parameters: 16,000 amps; 0.13 seconds on and then 1.87 seconds off; repeated 20 times; and then allow for 15 seconds for a part change. The energy input $E=16,000^{**}2^{*}0.001^{*}0.13=33.280$ Joules. Over a period of 55 seconds gives a $Q=605.1$ Watts. Therefore, the required vertical area is $A=605.1/20(250-23)=0.13$ square meters or approximately 1.4 square feet.

In the two examples illustrated, even though the current is higher in the second example (16 kA versus 9 kA) and the time to complete each weld is shorter (2 seconds versus 4.43 seconds), the required surface area is smaller. The difference is because the overall period is much longer (55 seconds versus 4.43 seconds). Thus, convection plays a major role in cooling the gun assembly. Using sufficient surface area, no other cooling mechanisms are required other than natural conduction and convection as discussed above.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An improved weld gun assembly for use in an electric welding system having a closed loop coolant system comprising:
    a coolant line;
    at least one check valve disposed within said coolant line;
    a highly conductive coolant contained within said coolant line;
    a heat source including an electrode and a transformer of said assembly;
    a heat exchanger connected to said heat source by means of said coolant line; and
    a mechanical, non-electrical coolant pump.

2. An improved weld gun assembly as recited in claim 1, said coolant pump comprising a cylinder with a mechanically operated piston, said piston moving in said cylinder in response to changes in the welding electrode separation distance to circulate said coolant such that said coolant picks up heat from said heat source and releases at least a portion of said heat through said heat exchanger.

3. An improved weld gun assembly as recited in claim 1, wherein said assembly includes a welding gun having at least one pivoting arm on which a welding electrode is mounted, and a mechanical linkage secured to said piston, a first end of said linkage pivotally secured to said pivoting arm and a second end pivotally secured to said piston.

4. An improved weld gun assembly as recited in claim 3, wherein said pivoting arm pivots about a pivot point, an intermediate portion of said linkage pivotally secured to said pivot point.

5. An improved weld gun assembly as recited in claim 2, wherein said closed loop system includes a first coolant pathway between one end of said cylinder and a second end of said cylinder, a first check valve permitting movement of said coolant from said second end to said first end when said piston moves from said first end to said second end of said cylinder.

6. An improved weld gun assembly as recited in claim 5, wherein said closed loop system includes a second coolant pathway between said heat source and said first end of said cylinder and a third coolant pathway between said heat source and said heat exchanger.

7. An improved weld gun assembly as recited in claim 6, wherein a second check valve is disposed in one of said second and third coolant pathways to only permit flow of said coolant only from said first end of said cylinder to said heat exchanger by way of said heat source.

8. An improved weld gun assembly as recited in claim 7, wherein a fourth coolant pathway is disposed between said heat exchanger and said second end of said cylinder, a third check valve disposed in said fourth coolant pathway and only permitting flow of said coolant between said heat exchanger and said second end.

9. An improved weld gun assembly as recited in claim 1, said assembly further comprising:
    a movable actuator, one end of said actuator being selectively movable between a rest position and an activation position, said closed loop system bypassing said heat source and said heat exchanger as said actuator moves from a rest position to an activation position.

10. An improved weld gun assembly as recited in claim 1, wherein said coolant pump comprises an elastic bladder.

11. An improved weld gun assembly as recited in claim 10, wherein a first check valve is disposed within said coolant line between said heat source and said bladder; and a second check valve disposed between said heat source and said heat exchanger within said coolant line, said expanding coolant flowing from said heat source through said first check valve to said bladder upon the addition of heat to said heat source and selectively to said heat exchanger.

12. An improved weld gun assembly as recited in claim 11, wherein said bladder expands against a bias to accommodate increased volume from said expanding coolant, said first check valve selectively closing upon termination of the expansion of said coolant and said second valve selectively opening to re-supply coolant under force from said bladder as it returns to its original configuration.

13. An improved weld gun assembly as recited in claim 12, wherein said coolant is vapor-like in an expanded heated state and fluid-like in a cooled state.

14. An improved weld gun assembly comprising:
    electrode arms, at least one of said arms including one of a plurality of ribs along an outer surface defining channels therebetween and an opening within said arm to increase the total outer surface area of said arm to improve heat dissipation through natural convection.

15. An improved weld gun assembly as recited in claim 14, wherein said arm includes both said ribs and said channels, and said opening.

16. An improved weld gun assembly as recited in claim 14, wherein each of said electrode arms have generally equal masses to provide thermal balancing.

17. An improved weld gun assembly as recited in 16, claim wherein said mass of each arm is maximized adjacent receptacles adapted to retain electrodes.

18. An improved weld gun assembly as recited in claim 14, wherein said ribs and said opening extend vertically.

19. An improved weld gun assembly comprising opposing electrode arms, each of said arms including a plurality of generally vertically extending ribs along an outer surface defining channels therebetween to improve heat dissipation through natural convection, and wherein each of said electrode arms have generally equal masses to provide thermal balancing, said mass outer surface area being maximized adjacent receptacles adapted to retain mating electrodes.

20. An improved weld gun assembly relying solely on electrode arm material conduction and natural convection from an outer surface of said electrode arm to cool said gun assembly, said gun assembly maximizing electrode arm mass and outer surface area in a region adjacent receptacles adapted to retain mating electrodes.

21. An improved weld gun assembly for use in an electric welding system having a closed loop coolant system comprising:
    a coolant line;
    a highly conductive coolant contained within said coolant line;
    a high weld current heat source;
    a heat exchanger connected to said heat source by means of said coolant line; and a mechanical, non-electrical coolant pump,
wherein a first check valve is disposed within said coolant line between said heat source and said coolant pump; and a second check valve disposed between said heat source and said heat exchanger within said coolant line, said coolant flowing from said heat source through said first check valve to said coolant pump upon the addition of heat to said heat source and selectively to said heat exchanger.

22. An improved weld gun assembly as recited in claim 21, wherein said coolant pump comprises a cylinder with a mechanically operated piston, said piston moving in said cylinder upon operation of said weld gun assembly to circulate said coolant such that coolant picks up heat from said heat source and releases at least a portion of said heat through said heat exchanger.

23. An improved weld gun assembly as recited in claim 21, wherein said assembly includes a welding gun having at least one pivoting arm, and a mechanical linkage secured to said piston, a first end of said linkage pivotally secured to said pivoting arm and a second end pivotally secured to said piston.

24. An improved weld gun assembly as recited in claim 23, wherein said pivoting arm pivots about a pivot point, an intermediate portion of said linkage pivotally secured to said pivot point.

25. An improved weld gun assembly as recited in claim 22, wherein said closed loop system includes a first coolant pathway between one end of said cylinder and a second end of said cylinder, the first check valve permitting movement of said coolant from said second end to said first end when said piston moves from said first end to said second end of said cylinder.

26. An improved weld gun assembly as recited in claim 25, wherein said closed loop system includes a second coolant pathway between said heat source and said first end of said cylinder and a third coolant pathway between said heat source and said heat exchanger.

27. An improved weld gun assembly as recited in claim 26, wherein the second check valve is disposed in one of said second and third coolant pathways to only permit flow of said coolant only from said first end of said cylinder to said heat exchanger by way of said heat source.

28. An improved weld gun assembly as recited in claim 27, wherein a fourth coolant pathway is disposed between said heat exchanger and said second end of said cylinder, a third check valve disposed in said fourth coolant pathway and only permitting flow of said coolant between said heat exchanger and said second end.

29. An improved weld gun assembly as recited in claim 21, said assembly further comprising:

a movable actuator, one end of said actuator being selectively movable between a rest position and an activation position, said closed loop system bypassing said heat source and said heat exchanger as said actuator moves from a rest position to an activation position.

30. An improved weld gun assembly as recited in claim 21, wherein said coolant pump comprises an elastic bladder.

31. An improved weld gun assembly as recited in claim 30, wherein said bladder expands against a bias to accommodate increased volume from said expanding coolant, said first check valve selectively closing upon termination of the expansion of said coolant and said second valve selectively opening to re-supply coolant under force from said bladder as it returns to its original configuration.

32. An improved weld gun assembly as recited in claim 31, wherein said heat source is one of an electrode and a transformer of said assembly.

33. An improved weld gun assembly as recited in claim 32 wherein said coolant is vapor-like in an expanded heated state and fluid-like in a cooled state.

* * * * *